United States Patent [19]
Asplund et al.

[11] 3,936,222
[45] Feb. 3, 1976

[54] GAS TURBINE CONSTRUCTION

[75] Inventors: Herbert F. Asplund, South Windsor; John R. Hess, Middletown; Joseph R. Kozlin, West Hartford, all of Conn.

[73] Assignee: United Technologies Corporation, Hartford, Conn.

[22] Filed: Mar. 28, 1974

[21] Appl. No.: 455,838

[52] U.S. Cl............. 416/95; 416/220 R; 416/193 R
[51] Int. Cl.² ........................................... F01D 5/18
[58] Field of Search ....... 416/219, 220, 244 A, 500, 416/193, 95, 221, 215, 218

[56] References Cited
UNITED STATES PATENTS

| | | | |
|---|---|---|---|
| 3,137,478 | 6/1964 | Farrell | 416/244 A X |
| 3,455,537 | 7/1969 | Kozlin et al. | 416/220 X |
| 3,644,058 | 2/1972 | Barnabei et al. | 416/95 |
| 3,814,539 | 6/1974 | Klompas | 416/95 |

*Primary Examiner*—Everette A. Powell, Jr.
*Attorney, Agent, or Firm*—Robert C. Walker

[57] ABSTRACT

A gas turbine disk design having a sideplate construction which prevents the leakage of hot gas across the turbine disk is disclosed. The sideplates are segmented and facilitate cooling of the turbine blades. Slidably mounted studs hold the sideplates in surface contact with the disk and prevent the buildup of stress concentrations in either the plates or the attaching members.

6 Claims, 5 Drawing Figures

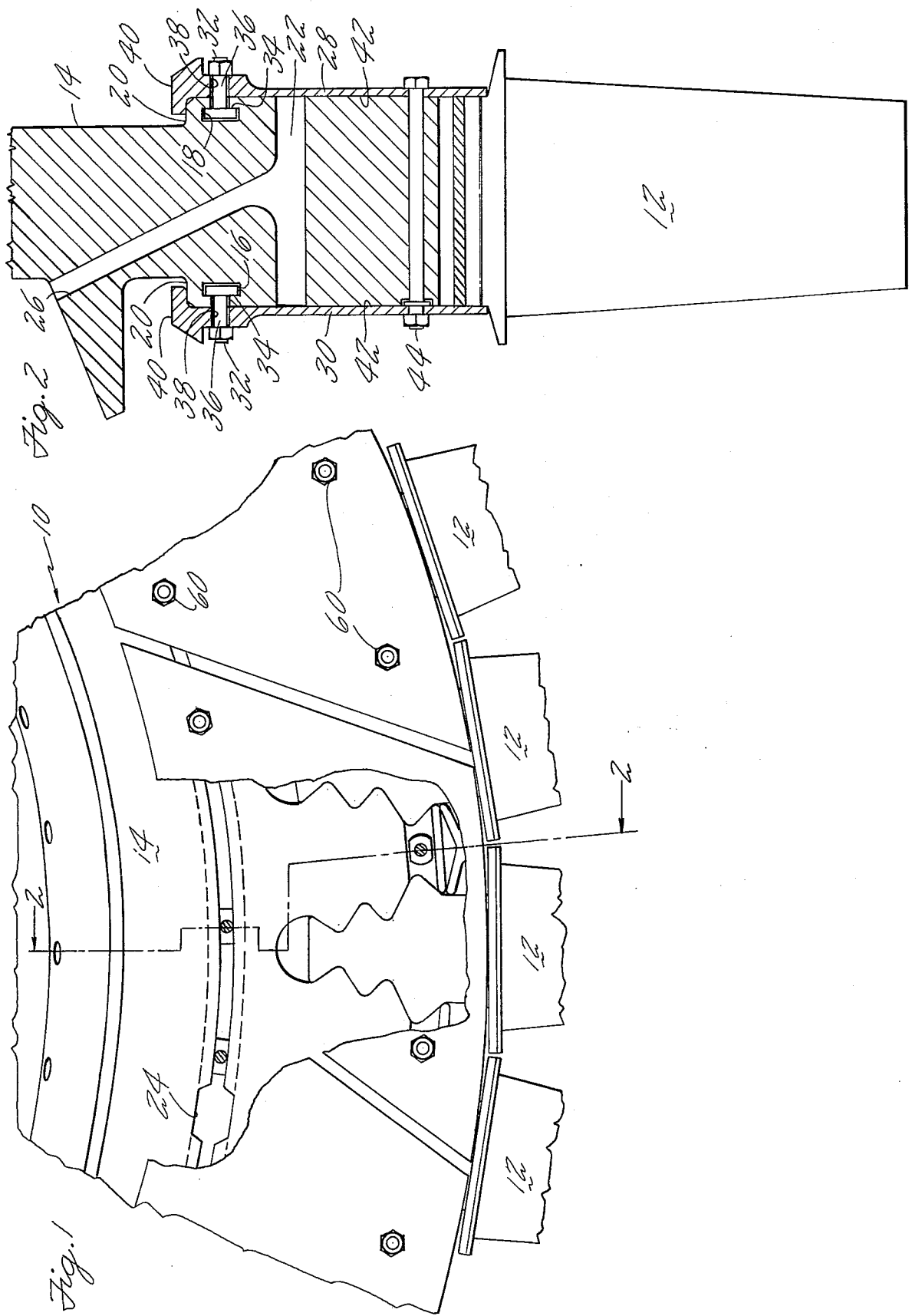

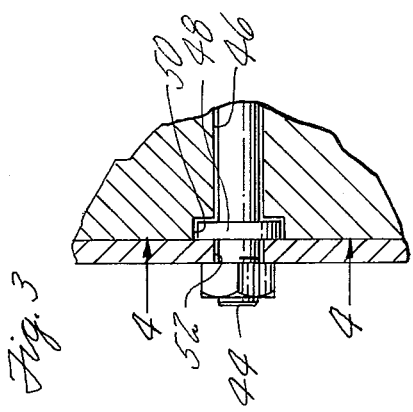
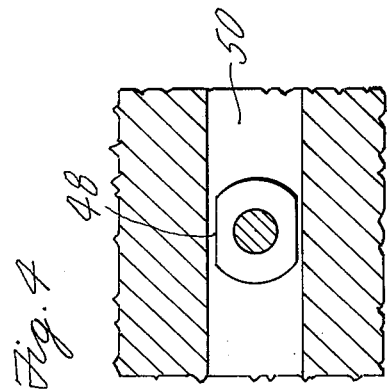
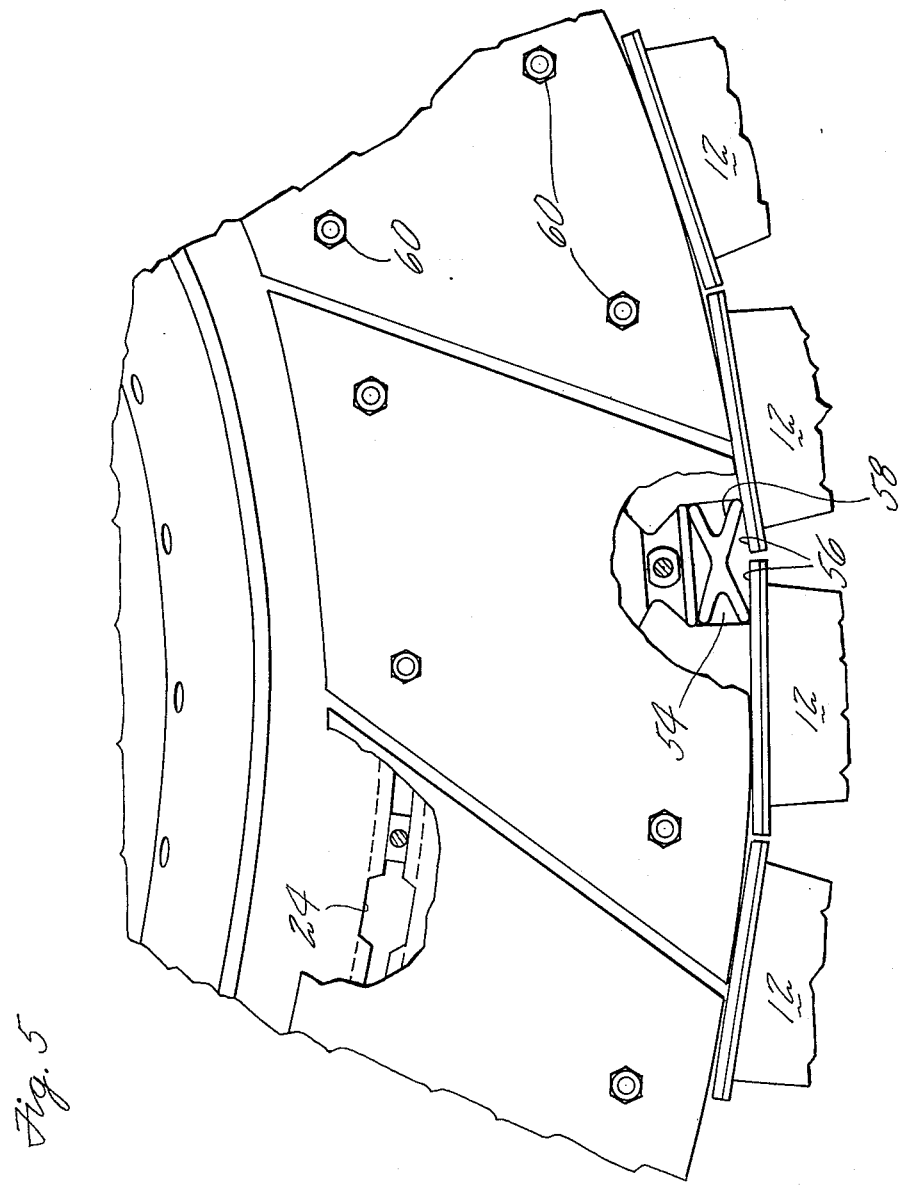

GAS TURBINE CONSTRUCTION

BACKGROUND OF THE INVENTION

1. Field of the Invention

The present invention relates to gas turbine engines and more specifically to the construction of turbine disk and blade assemblies for use in high temperature gas turbine engines.

2. Description of the Prior Art

The construction of disk and blade assemblies for gas turbine engines has always required precise engineering to ensure structural integrity of individual components during engine operation. Significant efforts are being made to reduce the high centrifugal and thermal stresses often occurring in individual engine components and to reduce the performance losses resulting from the leakage of hot gases through the turbine blade attachment region to a lower pressure stage. Similarly, efforts are being made to use cooling air more efficiently.

Turbine rotor assemblies in gas turbine engines consist of one or more stages of disk and blade assemblies wherein individual blades are attached to the rim of a turbine disk and extend in a radially outward direction. During rotation of the disk, tensile stresses occur in the blades as a result of centrifugal force. The magnitude of these stresses is highest in the blade root region of the turbine disk and complex attachment shapes have been adopted in order to reduce these stresses. A typical attachment means is the fir tree type connector shown in U.S. Pat. No. 3,666,376 to Damlis. The turbine disks which are exposed to the hottest gases are sometimes formed with cooling air plenum chambers in the base of the fir tree slot in the disk as is also shown in Damlis. Cooling air enters the chamber by any of a number of distribution means and leaves the plenum chamber traveling radially through the root portion of the blades and ultimately exiting through cooling holes on the airfoil section of the turbine blades.

In order to accommodate tangential thermal growth of the turbine blades and turbine blade platforms, modern engines are constructed with tangential clearance between the blade platforms of adjacent turbine blades. The clearance accommodates thermal cycling in the engine; however, the blades tend to vibrate unless damped. Damlis shows the use of a turbine blade damper in a substantially axial cavity defined by the turbine blade roots, the turbine disk and adjacent turbine blade platforms. The damping member can be restrained within the platform by various means including a tab and slot arrangement.

Gas leakage in the axial direction from the high to the low pressure side of the disk and blade assembly is not uncommon. The leakage occurs through the turbine root cavity, the turbine blade damper cavity, and the interface between the turbine blade root and the disk at the fir tree connector. Various constructions have been divised to prevent this leakage. For example, Damlis shows a typical construction in which annular sideplates are riveted to the turbine disk. Pratt et al show annular sideplates attached to the opposing faces of the turbine disk and secured by interlocking dogs on the disk and sideplates in U.S. Pat. No. 3,096,074. A similar construction in which the sideplates are attached to the disk with radially aligned pins is disclosed in U.S. Pat. No. 3,455,537. In U.S. Pat. No. 3,295,825, Hall teaches the use of sideplates attached to the turbine disk with a bayonet type connector, a separate sideplate being secured to each face of the disk with L-shaped lugs which extend from the turbine blade root region.

Each of the constructions described above is useful, however, as operating temperatures of gas turbines continue to increase, the thermal and centrifugal forces have a greater tendency to warp the sideplates thereby interrupting the surface contact between the sideplates and the turbine disks. The amount of gas leakage across the turbine disk is directly related to the extent to which the surface contact is disrupted. In addition, annular sideplates experience stress concentrations due to thermal and centrifugal loads and fracture of the sideplates or of the sideplate attaching members can result.

The segmentation of sideplates with provisions for adequate clearance between the segments can reduce the sideplate deformation resulting from centrifugal and thermal forces, however, warping and gas leakage are still excessive.

SUMMARY OF THE INVENTION

A primary object of the present invention is to prevent gas leakage in the axial direction across a turbine disk and to prevent premature leakage of cooling air into the hot gas stream from cooling air passages and cavities in the disk and blade assembly. Other objects are the reduction of thermal and centrifugal force related stress concentrations within the assembly and the simplification of blade removal and replacement.

According to the present invention, segmented sideplates are attached to each side of a turbine disk with a plurality of studs trapped in a circumferential track in the disk, each segmented sideplate preventing the leakage of hot gas in the axial direction through the turbine blade root cavity, the turbine blade damper cavity and the interface between the turbine blade root and the disk.

One feature of the present invention is the L-shaped cross section of the individual sideplates, the base portion of which engages the disk and transfers centrifugal loads from the sideplates to the disk during turbine rotation. Another feature of the present invention is the circumferential tracks on the side of the turbine disk which hold the sideplate attaching means. In one embodiment a second sideplate attaching means is located in the dead rim portion of the portion disk, the attaching means having a shoulder to prevent axial movement during the removal of individual sideplates.

A principal advantage of the present invention is the slidability of the sideplate retaining means within the disk circumferential track during conditions of circumferential growth between the sideplates and the disk, thus avoiding stress concentrations in the sideplates and retaining members. Sideplate restraining loads are transferred to the disk by the base portion of the sideplates resulting in low stress concentrations in the retaining members. Still another advantage of the present invention is the relatively low stress concentrations in the disk made possible by locating the tangential retaining bolts in the dead rim portion of the disk.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 1 is a simplified elevation view of a portion of the turbine disk and blade assembly showing the location of sideplates on the high pressure side of the assembly;

FIG. 2 is a simplified section view taken along the line 2—2 as shown in FIG. 1;

FIG. 3 is an expanded view of the sideplate attaching throughbolt on the high pressure side of the disk;

FIG. 4 is a section view taken along the line 5—5 as shown on FIG. 3; and

FIG. 5 is a simplified elevation view of a portion of the turbine disk and blade assembly showing the location of sideplates on the low pressure side of the assembly.

DESCRIPTION OF THE PREFERRED EMBODIMENT

A simplified turbine disk and blade assembly 10 is shown in elevation in FIG. 1. A plurality of turbine blades 12 is attached to the turbine disk 14 by fir tree type connections. Referring to FIG. 2, the disk has a first circumferential track 16 on the disk high pressure side and a second circumferential track 18 on the disk low pressure side. The disk also has circumferential shoulders 20 on both the high pressure and low pressure sides of the disk, a cooling air plenum chamber cavity 22 extending the full width of the disk at the base of each fir tree type connecting slot, and bolt track loading slots 24 on both the high pressure and low pressure sides of the disk. A cooling air passage 26 connects the cooling air plenum chamber cavity with a cooling air supply not shown.

The turbine blade is retained axially by a low pressure sideplate 28 and a high pressure sideplate 30. The sideplates are segmented and are cut on a bias. Tee head attaching studs 32, each of which has a retaining surface 34, are located in the tracks; the sideplates are removably attached to the disk by the studs, a shank portion 36 of each stud protruding through a corresponding attaching stud hole 38 in the sideplate. Each sideplate has a base portion 40 which cooperates with a corresponding circumferential shoulder on the disk. Each sideplate has a face 42 which is held in surface contact with the disk by throughbolts 44.

A cross section of the high pressure attaching side of the throughbolt is shown in FIG. 3. The throughbolt extends through a disk hole 46 and a shoulder 48 on the throughbolt engages a corresponding recess 50 in the disk as shown in FIG. 4. Each end of the throughbolts protrudes through a corresponding throughbolt hole 52 in the sideplate.

A turbine blade vibration damper cavity 54 as shown in FIG. 5 is defined axially by the sideplates and radially by the disk and turbine blade platforms 56. A vibration damper 58 rests within the damper cavity. The retaining studs and the throughbolts in cooperation with retaining nuts 60 secure the assembly components.

The above described components are sequentially assembled in the following manner to form the turbine disk and blade assembly. A plurality of attaching studs is placed in a circumferential track 18 through the loading slot on the low pressure side of the disk. Each stud is then slid within the track to a new location corresponding to the hole spacing of the attaching stud holes. Each of the throughbolts is inserted through one of the disk holes such that the shoulder on the throughbolt engages a recess in the disk to prevent rotation of the throughbolt as a retaining nut is attached. One segmented sideplate 28 is placed in contact with the disk, the shank portion of the retaining studs protruding through the attaching stud holes and the sideplate being secured by retaining nuts; the throughbolts protruding through throughbolt holes and the sideplate being held in surface contact with the disk by the retaining nuts. The turbine blades are inserted into the fir tree type connecting slots in the disk and the vibration dampers are inserted into the damper cavities. The retaining studs are placed in the circumferential track 16 through the loading slot on the high pressure side of the disk. Each retaining stud is slid within the circumferential track to a new location corresponding to the spacing of the attaching stud holes 38. The segmented sideplate 28 is placed in contact with the disk, the shank portion of the retaining studs protruding through attaching stud holes and the sideplate being secured by retaining nuts; the throughbolts protruding through the throughbolt holes and the sideplates being held in contact with the disk by retaining nuts. The assembly procedure is repeated until segmented sideplates cover the entire periphery of the disk.

The segmented sideplates are cut on a bias, the bias cut being oriented within the dead rim portion of the disk and the blade root so as not to intersect a cooling air plenum chamber cavity or a vibration damper cavity. A blade is replaced by first removing the high pressure segmented sideplate covering the blade root. In locations where the bias cut intersects a blade root, two adjacent sideplates must be removed.

Differential growth between the disk and sideplates due to the thermal properties of these components can generate detrimental stresses in the turbine during normal conditions of operation. The differential growth results from two primary contributing factors, namely, material composition and operating temperature. The disk and the sideplates are sometimes formed from different material and the difference in their coefficients of expansion leads to mismatched dimensional changes as the engine cycles thermally. In addition, these components are subjected to uneven heating and cooling at any given operating condition since the expanding hot gases pass over the outer surfaces and the cooling air passes internal of the assembly. In the present invention, the differential thermal growth at the inner circumference of the sideplates does not result in stress concentration because the retaining studs have the ability to slide if necessary within the tracks; differential growth at the outer circumference of the sideplates does not result in stress concentration because the throughbolts, have sufficient radial clearance to relocate within the disk holes. Although studs are restrained in the tracks, and axially position the sideplates with respect to the disk, the heads of the studs have sufficient clearance within the track to accommodate differential thermal growth as described above. Similarly the throughbolts which are retained in the disk holes and hold the sideplates in surface contact with the disk have sufficient clearance with their corresponding disk and sideplate holes to accommodate thermal growth.

The dead rim portion of the turbine disk receives tangential sideplate restraining loads from the throughbolts. The throughbolts in cooperation with the nuts hold the faces of the sideplates in surface contact with the disk thereby affecting a gas seal at the cooling air plenum chamber, the blade root interface and the damper cavity. The cooling air plenum chamber, the blade root interface and the damper cavity are pressurized by cooling air supplied through passage 26. Any air leaking past the sideplates will be cooling gases from the pressurized chambers rather than high temperature turbine gases.

The embodiment described above relates principally to turbines having air-cooled blades. If cooling is not required the cooling air plenum chambers may be eliminated, the fir tree type connections located closer to the engine centerline and sideplate radial depth reduced by a corresponding amount. The retaining studs alone may then hold the sideplate faces in contact with the disk and transmit tangential retaining loads from the disk to the sideplates.

Although the invention has been shown and described with respect to preferred embodiments thereof, it should be understood by those skilled in the art that the foregoing and other changes in the form and detail thereof can be made without departing from the spirit and the scope of the present invention.

We claim:

1. In a gas turbine engine, a rotatable disk and blade assembly comprising:
   a disk having a side which is essentially perpendicular to the axis of rotation of the disk and which includes a track incorporated therein;
   a plurality of blades attached to and extending radially from the disk;
   a plurality of sideplates in surface contact with the side of the disk; and
   means for attaching the sideplates to the disk, the attaching means slidably engaging the side track of the disk and having the freedom to relocate within the track under varying engine thermal conditions.

2. The invention according to claim 1 wherein the track is circular and concentric about the center of the disk.

3. In a gas turbine engine, a disk and blade assembly comprising:
   a turbine disk having,
      a plurality of blade loading slots which are located around the outer circumference of the disk,
      a circular track in the side of the disk, and a plurality of holes which pass through the disk between the blade loading slots;
   a plurality of turbine blades attached to the disk, each blade being fitted into a corresponding loading slot in the disk;
   a plurality of segmented sideplates in surface contact with the disk, each sideplate having at least one attaching stud hole and at least one throughbolt hole;
   a plurality of attaching studs, each stud being slidably retained in the track and protruding through one of the attaching stud holes, each sideplate being secured to the disk with retaining nuts in cooperation with the studs; and
   a plurality of throughbolts, each throughbolt being retained in a disk hole and protruding through one of the throughbolt holes, each sideplate being held in surface contact with the disk by retaining nuts in cooperation with the throughbolts.

4. The invention according to claim 3 wherein the attaching studs are Tee headed bolts.

5. The invention according to claim 3 wherein each throughbolt has a shoulder which engages a corresponding recess in the disk.

6. In a gas turbine engine, a disk and blade assembly comprising:
   a turbine disk having,
      a plurality of blade loading slots which are located around circumference of the disk,
      a circular track in the side of the disk, and a cooling air chamber at the base of each blade loading slot;
   a plurality of turbine blades which are fitted into corresponding loading slots in the disk rim, each blade having a platform section which extends circumferentially about, and is spaced apart from the rim thereby forming an axial platform cavity between adjacent platform sections and the rim;
   a plurality of segmented sideplates having attaching stud holes therein, the sideplates being held in surface contact with the disk and providing an axial enclosure to both the disk cooling air chamber and the axial platform cavity;
   a plurality of attaching studs, which are slidably retained in the disk track and protrude through the attaching stud holes; and
   a passage connecting the cooling air chamber and the axial platform cavity to a source of pressurized air.

* * * * *